(12) United States Patent
Rossman et al.

(10) Patent No.: US 10,473,746 B1
(45) Date of Patent: Nov. 12, 2019

(54) SYSTEM AND METHOD FOR RANK ESTIMATION OF ELECTROMAGNETIC EMITTERS

(71) Applicant: BAE Systems Information and Electronic Systems Integration Inc., Nashua, NH (US)

(72) Inventors: Court E. Rossman, Merrimack, NH (US); Thomas R. Vaccaro, Hudson, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 295 days.

(21) Appl. No.: 15/649,117

(22) Filed: Jul. 13, 2017

Related U.S. Application Data

(63) Continuation-in-part of application No. 15/380,310, filed on Dec. 15, 2016.

(51) Int. Cl.
| | | |
|---|---|---|
| *G01S 3/04* | (2006.01) | |
| *G01S 3/74* | (2006.01) | |
| *G01S 5/02* | (2010.01) | |
| *G01S 3/781* | (2006.01) | |

(52) U.S. Cl.
CPC .................. *G01S 3/04* (2013.01); *G01S 3/74* (2013.01); *G01S 3/781* (2013.01); *G01S 5/02* (2013.01)

(58) Field of Classification Search
CPC ..................... G01S 3/00–789; G01S 5/02–166
See application file for complete search history.

(56) References Cited

U.S. PATENT DOCUMENTS

| | | | | |
|---|---|---|---|---|
| 6,765,532 B2 * | 7/2004 | Vaccaro | .................. | G01S 7/021 342/195 |
| 7,372,404 B2 * | 5/2008 | Shirai | ....................... | G01S 3/74 342/417 |

* cited by examiner

*Primary Examiner* — Matthew M Barker
(74) *Attorney, Agent, or Firm* — Sand, Sebolt & Wernow LPA

(57) ABSTRACT

A system and method for rank estimation of electromagnetic emitters is provided. One aspect of the disclosure provides creating a graph of angles of arrival (AoAs) versus range and using a polynomial curve fit against the graph to determine a rank estimation of electromagnetic emitters. Another aspect of the disclosure provides using a search over parameters of the multiple polynomial curve fits, for each hypothesized rank, to optimize the rank estimation results. This search may be a greedy search to improve speed of convergence. Another aspect of the disclosure provides a metric 'score' to select the highest probability rank (number of emitters) based on the agreement between the multiple polynomial curve fits and residual AoA errors.

20 Claims, 9 Drawing Sheets

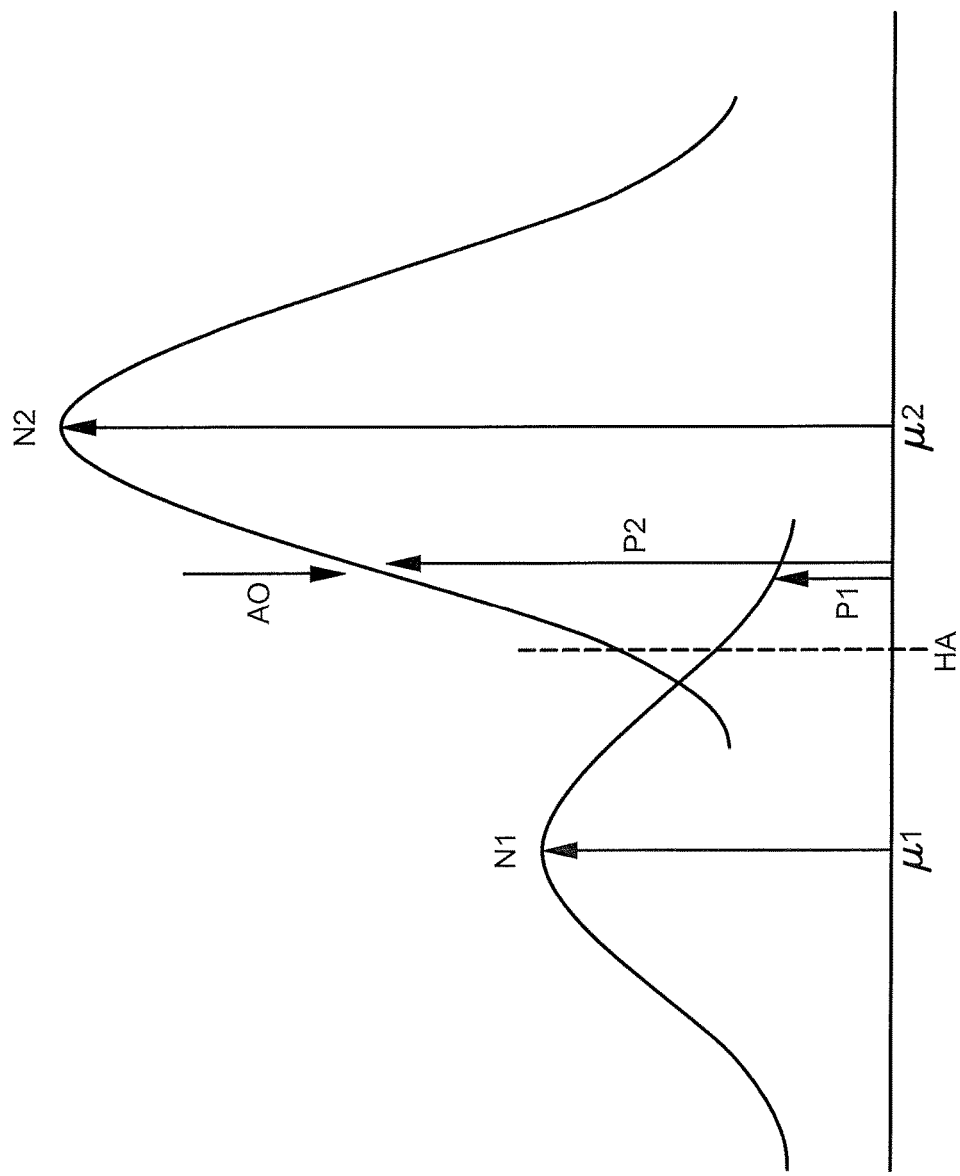

SYSTEM AND METHOD FOR RANK ESTIMATION OF ELECTROMAGNETIC EMITTERS

CROSS REFERENCE TO RELATED APPLICATIONS

This application is a continuation in part of U.S. patent application Ser. No. 15/380,310, filed on Dec. 15, 2016; the disclosure of which is incorporated herein by reference.

STATEMENT OF GOVERNMENT INTEREST

This present disclosure was made with United States Government support under Contract No. HR0011-14-C-0079 awarded by the Defense Advanced Research Projects Agency (DARPA). The government has certain rights in the invention.

BACKGROUND

Technical Field

The present disclosure relates generally to ranking. More particularly, the present disclosure relates to rank estimation. Specifically, the present disclosure relates to rank estimation of electromagnetic emitters.

Background Information

Generally, in military telecommunications, Electronic Support Measures (ESM) involve, amongst other things, searching for, intercepting, identifying and locating sources of radiated electromagnetic energy for the purpose of immediate threat recognition. For example, ESM include estimating the number of emitters (e.g. radars at different locations). Although many systems and methods of estimating the number of emitters have been developed, such systems and methods have some shortcomings.

For example, many systems and methods employ unconstrained programs which make it difficult to estimate the number of emitters, including, but not limited to, estimating co-channel emitters. Further, many systems and methods are computationally-intensive which is a disadvantage when immediate threat recognition is necessary. Therefore, there is a need for an improved system and method for rank estimation of emitters.

SUMMARY

In one aspect, the present disclosure may provide a system for determining a rank estimation of electromagnetic emitters comprising a moveable detection system and a non-transitory computer-readable storage medium having instructions encoded thereon that, when executed by one or more processors, result in the following operations for determining rank estimation of electromagnetic emitters: measuring angles of arrival (AoAs) of at least one signal emitted from at least one electromagnetic emitter received at a detection system; estimating an accuracy of the measured AoAs by the detection system; assigning a track to the AoAs; creating a graph of the AoAs versus an estimated range or time; declaring a maximum set of hypothesized ranks; iteratively testing each rank of the set of hypothesized ranks by curve fitting a set of polynomial curves for each rank of the set of hypothesized ranks to the graph, wherein the number of polynomial curves is equal to the particular hypothesized rank; calculating hard scores for all combinations of coefficients for each of the polynomial curves for each rank of the set of the hypothesized ranks; storing only a maximum hard score and a set of coefficients for the maximum hard score for each of the hypothesized ranks; determining a rank estimation of the at least one electromagnetic emitter; and reporting the track associated with the at least one electromagnetic emitter.

In another aspect, the present disclosure may provide a method for rank estimation of electromagnetic emitters comprising: moving a detection system in a trajectory and measuring angles of arrival (AoAs) of at least one signal emitted from at least one electromagnetic emitter received at the detection system. The method may further include estimating an accuracy of the measured AoAs by the detection system, assigning a track to the AoAs, creating a graph of the AoAs versus estimated range or time, declaring a maximum set of hypothesized ranks, iteratively testing each rank of the set of hypothesized ranks by curve fitting a set of polynomial curves for each rank of the set of hypothesized ranks to the graph, wherein the number of polynomial curves is equal to the particular hypothesized rank, calculating hard scores for all combinations of coefficients for each of the polynomial curves for each rank of the set of hypothesized ranks, storing only a maximum hard score and a set of coefficients for the maximum hard score for each of the hypothesized ranks, determining a rank estimation of the at least one electromagnetic emitter and reporting the track associated with the at least one electromagnetic emitter.

In another aspect, the present disclosure may provide a system and method for rank estimation of electromagnetic emitters is provided. One aspect of the disclosure provides creating a graph of angles of arrival (AoAs) versus range and using a polynomial curve fit against the graph to determine a rank estimation of electromagnetic emitters. Another aspect of the disclosure provides using a search over parameters of the multiple polynomial curve fits, for each hypothesized rank, to optimize the rank estimation results. This search may be a greedy search to improve speed of convergence. Another aspect of the disclosure provides a metric 'score' to select the highest probability rank (number of emitters) based on the agreement between the multiple polynomial curve fits and residual AoA errors.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

FIG. 8 (FIG. 8) is a graphical representation showing the probabilities, $P_1$ and $P_2$, that a particular AoA is associated with the first or second Gaussian curve of the graph.

Similar numbers refer to similar parts throughout the drawings.

DETAILED DESCRIPTION

Figure 1:
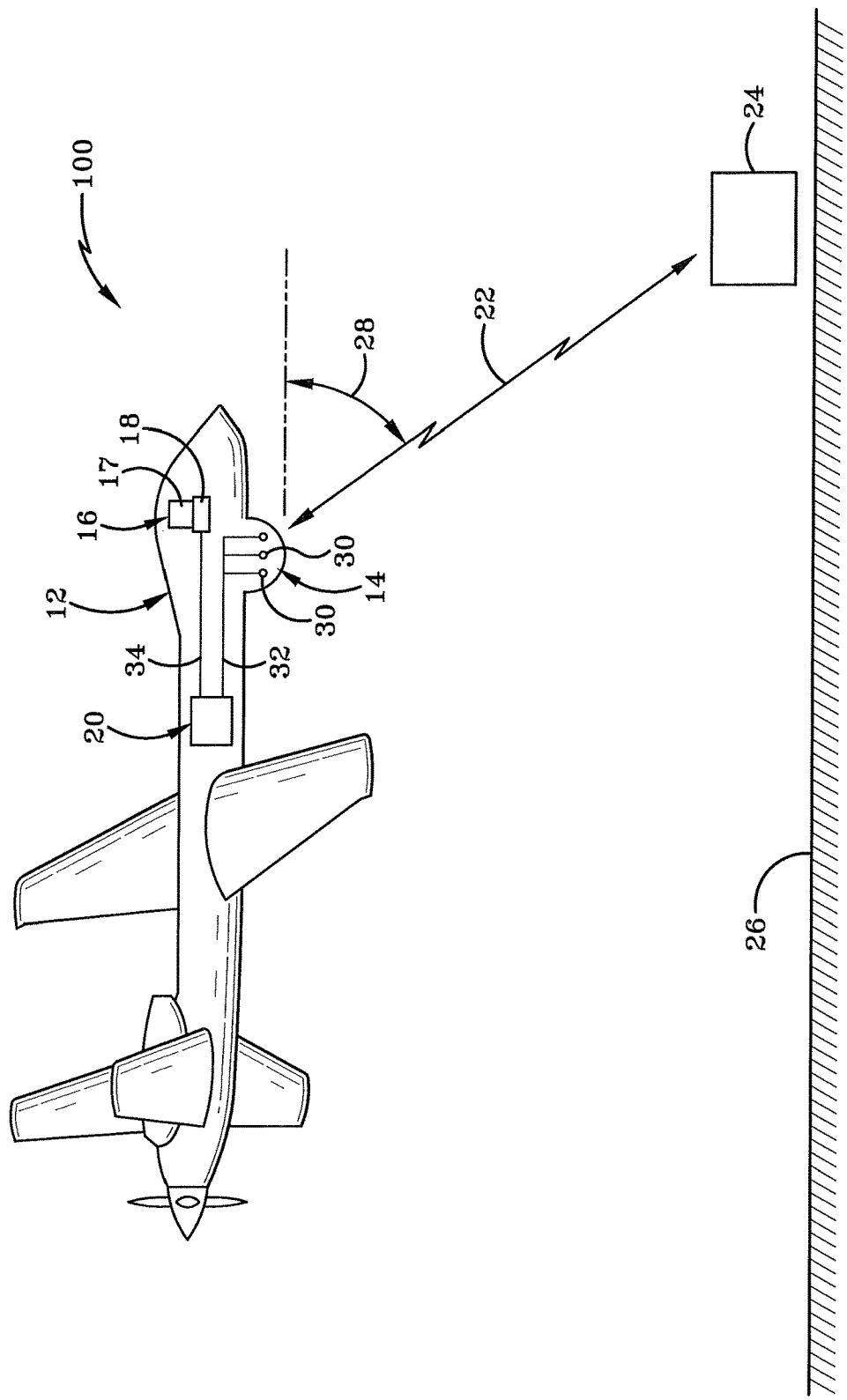
FIG. 1 (FIG. 1) is a general diagrammatic view of an embodiment of a ranking estimation system.

As depicted in FIG. 1, a ranking system for determining a rank estimation of electromagnetic emitters is broadly depicted as 100. Ranking system 100 may include a vehicle 12 carrying a detection system 14, a computer 16 operatively coupled to a memory 17 and a processor 18, a network connection 20, and at least one electromagnetic signal 22 coming from at least one electromagnetic emitter 24 detected by the detection system 14.

In accordance with one aspect of the disclosure, vehicle 12 is a flying device configured to move above the geographic landscape 26. Vehicle may be an aircraft, a drone or unmanned aerial vehicle (UAV) as one having ordinary skill in the art would understand. In another example, the vehicle refers to planes, helicopters, zeppelins, balloons, space shuttles, and the like. In another aspect according to the present disclosure, the vehicle 12 may be a ground-based vehicle or a water-based vehicle, such as a military land vehicle and a military warship respectively.

Detection system 14 is carried by vehicle 12 and may be selected from a group of known detection systems 14 capable of determining Angle of Arrival (AoA) 28 calculations of the at least one electromagnetic signal 22 coming from the at least one electromagnetic emitter 24, such as any suitable direction finding (DF) system. In one aspect according to the present disclosure, it is important to know the accuracy of the detection system 14. The DF system may report the measured AoA 28 and the expected accuracy of the AoA 28. In one embodiment according to the present disclosure, the accuracy of the DF system is a function of signal-to-noise ratio (SNR), of attitude (i.e. roll-pitch-yaw, if the DF system is on an aerial-based vehicle) and of the magnitude of the correlation interferometry direction finding (CIDF) correlation as one of ordinary skill in the art would understand. The at least one electromagnetic signal 22 may be transmitted in any one of a number of frequencies, including radar, communication, and other types of signals. The detection system 14 may calculate AoA 28 predictions and AoA 28 accuracy estimates based on measured voltages of the electromagnetic signals 22 received by at least one sensor 30, such as an antenna array, of the detection system 14.

In accordance with one aspect of the present disclosure, the processor 18 of the ranking estimation system 100 may be a radio frequency (RF) processor. The processor 18 may utilize various techniques to calculate the AoA 28 predictions and the AoA 28 accuracy estimates, including, but not limited to, time difference of arrival (TDOA), amplitude comparison and phase interferometry techniques, amongst any other suitable technique as one of ordinary skill in the art would understand. The ranking system 100 in one example is powered from the vehicle and in another example the ranking system 100 has its own power source.

Network 20 allows the transmittal of data from the at least one sensor 30 to the processor 18 and memory 17 in computer 16. In one particular embodiment, Network 20 is preferably an encrypted and secure high-speed Internet or intranet. When the at least one sensor 30 captures the at least one electromagnetic signal 22, the at least one electromagnetic signal is transmitted to network 20 via a first network connection 32. Processor 18 is operatively coupled to network 20 via a second network connection 34.

Further, while computer 16 is depicted as being carried by the vehicle 12, it is entirely possible that the computer 16 is remote from the vehicle 12. According to one aspect of the present disclosure, when the computer 16 is carried by the vehicle 12, the ranking process (described in greater detail below) occurring in memory 17 and processor 18 occurs onboard vehicle 12. In this latter aspect, the ranking processing would be performed on the vehicle 12 and the network 20 refers to the internal network within the vehicle.

According to one aspect of the present disclosure, the ranking estimation of the at least one emitters 24 is performed in processor 18 utilizing a track splitting code, such as Joint Maximum Likelihood Multiple Emitter Angle of Arrival (AoA)-versus estimated range (JML-ME-AoA-vs-Range) instructions. To accomplish the ranking estimation, computer 16 and processor 18 may operate in conjunction with memory 17 and a plurality of input/output ports which may be operably connected by a bus.

The range is an estimate, because the JML-ME-AoA-vs-Range instructions do not initially seek to determine range. The range values could equally be replaced by time to create an AoA 28 versus time graph instead of an AoA 28 versus estimated graph because the main purpose of the curve fitting is to determine clusters of smoothly varying AoAs 28 over time to determine number of electromagnetic emitters 24 and associations of the AoAs 28 with the electromagnetic emitters 24. However, the range estimate is helpful in that the curvature of the polynomial curve fit can be less constrained which reduces convergence time of running the JML-ME-AoA-vs-Range instructions when the electromagnetic emitter 24 is known to be farther away. Closer electromagnetic emitters 24 require a larger range of the high order coefficients in the polynomial curve.

In accordance with one aspect of the present disclosure, the computer 16 includes rank estimation logic configured to provide accurate rank estimation results. In different examples, the rank estimation logic may be implemented in hardware, software, firmware, and/or combinations thereof. Thus, the ranking estimation logic may provide means (e.g., hardware, software, firmware) of ranking emitters 24 by performing a polynomial curve fit to a graph of the measured AoAs 28 versus estimated range which is described in further detail below.

Computer 16 operates in the network 20 environment and thus may be connected to other the network devices (not shown) via the i/o interfaces, and/or the i/o ports. Through the network 20, the computer 16 may be logically connected to other remote computers. Networks with which the computer may interact include, but are not limited to, a local area network (LAN), a wide area network (WAN), and other networks. The networks may be wired and/or wireless networks.

The following paragraphs relate to the steps for a method of rank estimation. The method is accomplished by the computer 16, the memory 17 and processor 18 which operate to collectively to define a non-transitory computer-readable storage medium having instructions encoded thereon that, when executed by one or more processors, result in operations for determining estimation of emitters 24. The medium may further comprise instructions encoded thereon that, when executed by one or more processors, result in operations including, inter alia, estimating the rank of emitters 24 through a JML-ME-AoA-vs-Range step, wherein the JML-ME-AoA-vs-Range step includes fitting polynomial curves to a graph of the measured AoAs 28 versus estimated range. The medium may further comprise instructions encoded thereon that, when executed by one or more processors, result in performing a global search of all curve fitting parameters, or when speed may be a constraint, performing a greedy search. Further, the medium may further comprise instructions encoded thereon that, when executed by one or more processors, result in running false track protection measures before reporting the rank prediction.

In accordance with one aspect of the present disclosure, the method for rank estimation utilizes the JML-ME-AoA-vs-Range instructions to estimate the rank of emitters 24 based, at least in part, on AoA 28 calculations. In one particular embodiment, AoAs 28 are measured in real-time and are assigned to a particular track, which is a Kalman Filter (KF) track, as one of ordinary skill in the art would understand. If AoAs 28 in a cluster of AoAs 28 are within a certain angular separation from one another, as described in greater detail below, then all AoAs 28 in that particular cluster are assigned to the same track. Further, the AoAs 28 within that cluster are stored by the computer 16 within that particular track. Periodically, the AoAs 28 in that cluster are reviewed to determine if there is more than one track in the direction of that particular track by utilizing a batch process program, such as JML-ME-AoA-vs-Range instructions, and as further described below.

JML-ME-AoA-vs-Range instructions accomplish estimation of rank by utilizing a batch process program on stored AoAs 28. If the JML-ME-AoA-vs-Range instructions predict a higher rank than what the assumed rank should have been (e.g. a prediction of two emitters 24 instead of an assumed one emitter 24), then a computationally-intensive algorithm or program may be utilized to confirm the prediction of the additional emitter 24.

The method for rank estimation of emitters 24 utilizes JML-ME-AoA-vs-Range instructions. The JML-ME-AoA-vs-Range instructions are a technique to sort AoAs 28 based on groupings of AoAs 28 versus estimated range. The AoAs 28 are preconditioned by removing the motion of the sensor 30 from the AoA 28 measurement data. The pre-conditioned AoAs 28 versus estimated range are curve fit to multiple mostly-straight curves. All of the hypotheses for number of emitters 24 (rank/number of curves) are checked, and a metric 'score' for the best curve fit is calculated as more fully described below. The number of emitters 24 is predicted from the first rank that achieves a score above a threshold value.

The JML-ME-AoA-vs-Range instructions are not directly geo-location instructions. In other words, no range predictions are a product of the code directly from the JML-ME-AoA-vs-Range instructions. Rather, the JML-ME-AoA-vs-Range instructions will find suitable groupings of AoAs 28. This grouping of AoAs 28 will then be provided to the KF track, which is a geo-location prediction, in order to update or re-work the KF track. Therefore, JML-ME-AoA-vs-Range instructions are a sorting tool, but not directly a geo-location tool. The JML-ME-AoA-vs-Range instructions must be used in conjunction with a geo-location tool, such as the KF, in order to predict an estimated range.

In accordance with one aspect of the present disclosure, the AoA versus estimated range curve fitting is tolerant to emitter 24 motion which allows longer time gating for batch processing. This motion tolerance is an improvement over the Fixed Sigma Gaussian Mixture Model (FSGMM), as described in U.S. patent application Ser. No. 15/380,310, which is time-gate limited due to emitter 24 motion blurring of the AoA 28 distribution. In accordance with one aspect of the present disclosure, the emitter 24 motion is accounted for by the curvature of the lines fitted within the AoAs versus estimated range graph. Each emitter 24 can move at different velocities and the AoAs 28 vary smoothly with range.

The method creates a graph of a particular set of AoAs 28 versus estimated range. Various polynomial curves, such as second order or greater polynomial curves, may be utilized to fit the graph which allows emitter 24 motion to occur without the method predicting a false track. The AoAs 28 are plotted versus estimated range, as opposed to versus time, because the rate of change of the AoAs 28 is proportional to the inverse distance to the emitters 24. The limits on the coefficients for the curve fit parameters are allowed to increase as the predicted range gets smaller, due to the range-dependent curvature.

In one example, the sensor 30 is in motion (e.g., a receiver on a UAV or airplane) and the AoAs 28 measured at a previous time or location of the receiver need to be extrapolated to a single time or location of the sensor 30. That is, the motion of the sensor 30 needs to be removed from the AoA 28 measurement. This is accomplished by assuming that all emitters 24 are at the assumed same range, and by using the range and transverse motion of the sensor to compensate for the sensor 30 motion, which adds an offset to the measured AoAs 28. By removing the motion of the sensor 30 from the AOA 28 measurement data, the AOA 28 measurement data better approaches a straight line when plotted versus estimated range which simplifies the candidate curve fitting. In accordance with another aspect of the disclosure, the detection system 14 and the sensor 30 may be fixed on the ground or otherwise stationary. Smoothly varying groups of AoAs 28 may be sorted without the detection system 14 moving. When the goal is to sort AoAs 28 only, and not to perform geo-location or ranging, then a fixed detection system 14 will have better sorting ability; that is, no traverse bearing by the detection system 14 is required.

Figure 2B:
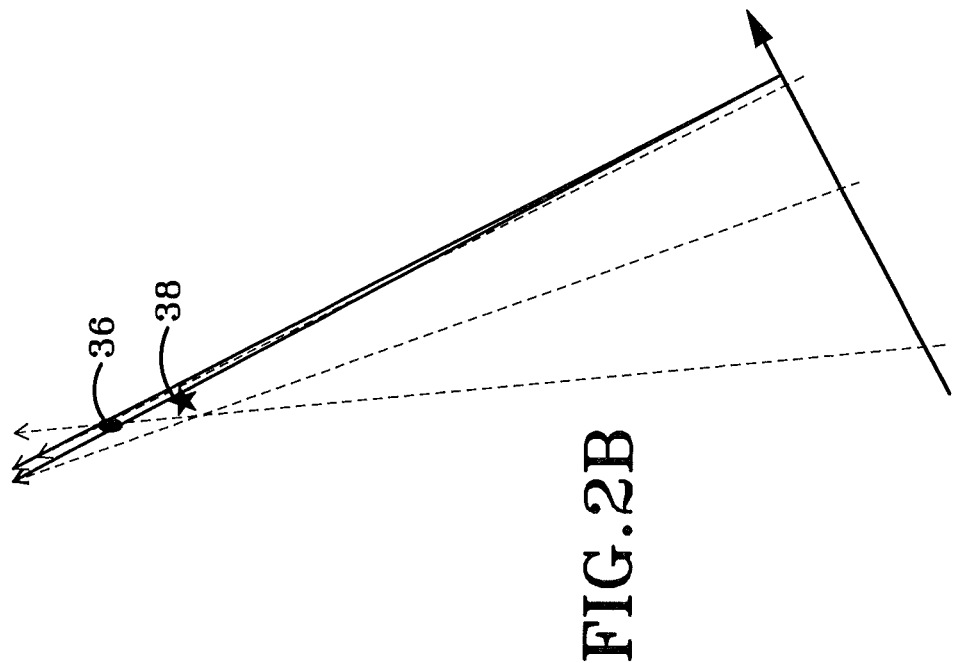
FIG. 2B (FIG. 2B) is dashed lines representing AoAs that are not extrapolated and solid lines representing AoAs that are extrapolated.
Figure 2A:
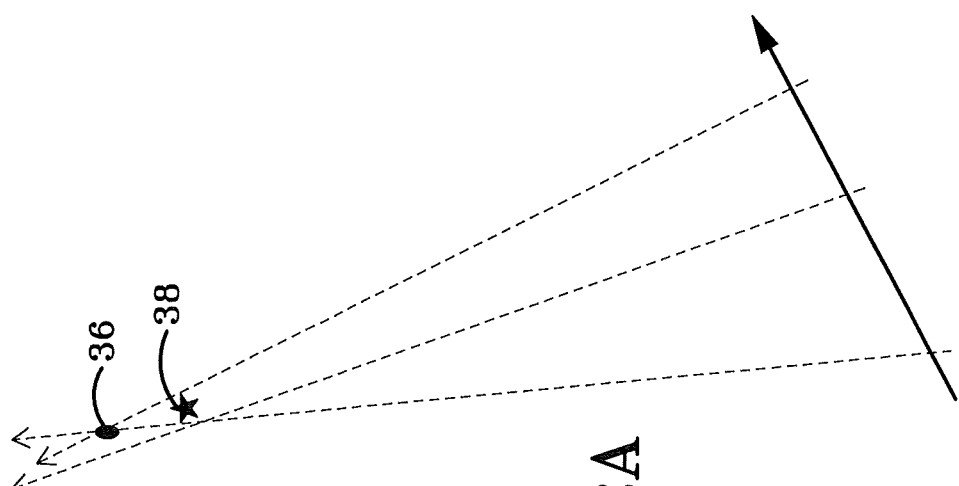
FIG. 2A (FIG. 2A) is dashed lines representing angles of arrival (AoAs) that are not extrapolated.

As an example of the extrapolation described above, reference is made to FIG. 2A which depicts AoAs 28 that are not extrapolated (shown as dashed lines) and FIG. 2B which depicts dashed lines representing AoAs 28 that are not extrapolated and solid lines representing extrapolated AoA 28 angles. The true emitter location is represented as 36 and the candidate emitter location is represented as 38. FIG. 2B assumes an arc or distance (not shown), from the emitters 24, and extrapolates the AoAs 28 based on the intersection of the AoAs 28 with the assumed arc. Since the arc must be assumed, the program may be run more than one time at different ranges (i.e. different assumed arcs) to determine an accurate assumed arc. Thus, the AoA 28 data is preconditioned to remove sensor 30 motion from the AoA 28 data.

According to one aspect of the present disclosure, when the sensor 30 is in motion (e.g. the sensor is on an aerial-based vehicle) the graph for JML-ME-AoA-vs-Range analysis may be an AoA-uncertainty weighted AoA 28 distribution. The DF system reports the measured AoA 28 and the expected AoA 28 accuracy based on the accuracy of the DF system. In one aspect according to the present disclosure, this accuracy is a function of SNR, of attitude (i.e. role-pitch-yaw of an aerial-based vehicle), of the magnitude of the correlation interferometry direction finding (CIDF) correlation, and of the ratio of the voltage to the mean voltage of the cluster of AoAs 28.

In accordance with one aspect of the present disclosure, the voltage weighting to estimate the AoA 28 accuracy is $V_{current}/V_{mean}$. The method imposes an upper limit of $(V_{current}/V_{mean})_{upper}$, to not allow very high voltages from dominating the distribution. The method also imposes a lower limit of $(V_{current}/V_{mean})_{lower}$, to avoid neglecting very low voltage measurements. AoAs 28 with relatively small voltages, or powers, should be de-weighted because they are most likely from side or back lobes with different incident polarizations, which cause less accurate DF measurements. On the opposite extreme, AoAs 28 with very high voltages are most likely main lobes, however, the DF accuracy should not be significantly better than the nominal voltage AoA 28, assuming a typical detection signal of greater than 13 decibels SNR.

Figure 3A:
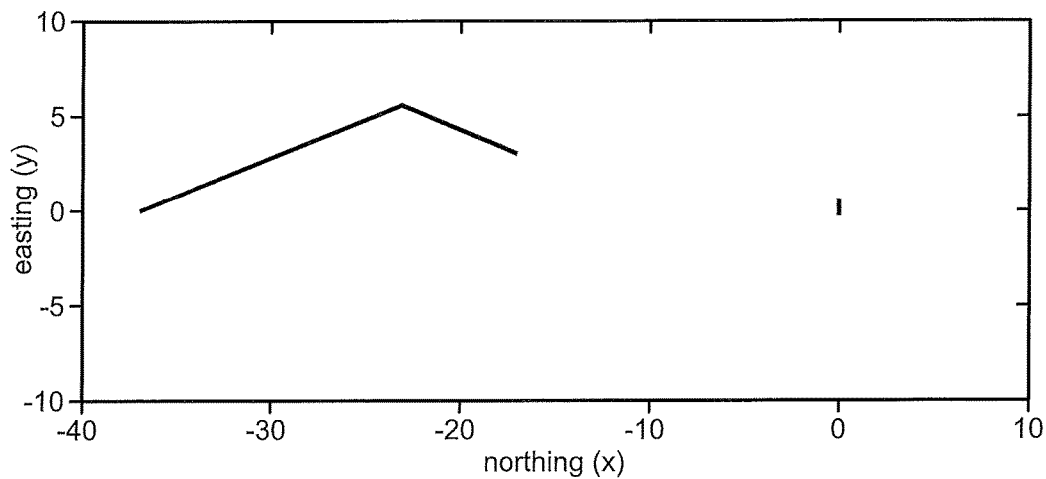
FIG. 3A (FIG. 3A) depicts easting (i.e. the eastward-measured distance) and northing (i.e. the northward-measured distance) of the sensor.
Figure 3B:
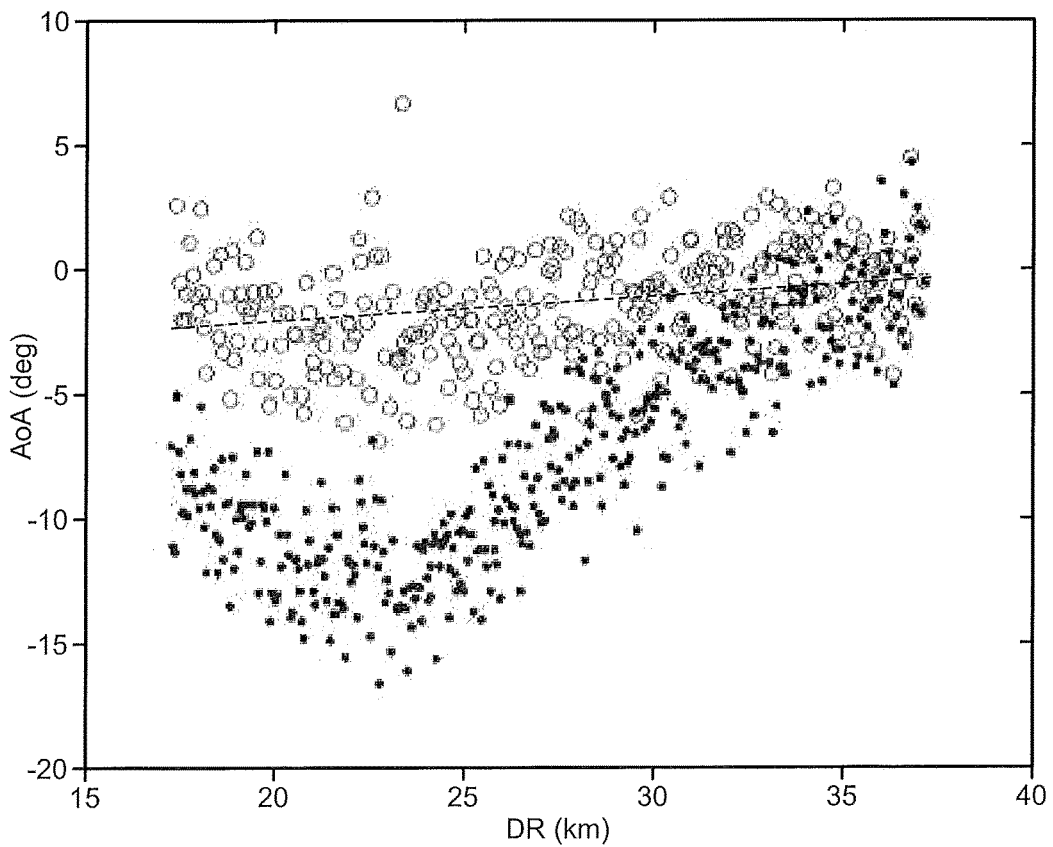
FIG. 3B (FIG. 3B) raw angles of arrival as solid points and preconditioned AoAs, or AoAs where the sensor motion has been removed, as hollow points.

In accordance with one aspect of the present disclosure, FIG. 3A depicts easting (i.e. the eastward-measured distance) and northing (i.e. the northward-measured distance) of the sensor 30. FIG. 3B depicts the raw AoAs 28 as solid points and preconditioned AoAs 28, or AoAs 28 where the sensor 30 motion has been removed, as hollow points. The data associated with the raw AoAs 28 and the preconditioned AoAs 28 is identical except as to the sensor 30 motion being removed. The hollow points are curve fitted with a polynomial curve fit. As shown in the graph of FIG. 3B, the preconditioned AoAs 28 provide a smoother set of AoA 28 data when compared to the raw AoAs 28 data of FIG. 3B. The sharp bend associated with the raw AoAs 28 data of FIG. 3B is difficult to fit with a polynomial curve fit.

In accordance with one aspect of the present disclosure, the LOB/AOA data is fit to multiple curves of the form:

$$LOB_{i\_curve}(R) = LOB_o + c1 \cdot \Delta R + c2 \cdot \Delta R^2 \quad \text{(Equation 1)}.$$

Figure 4A:
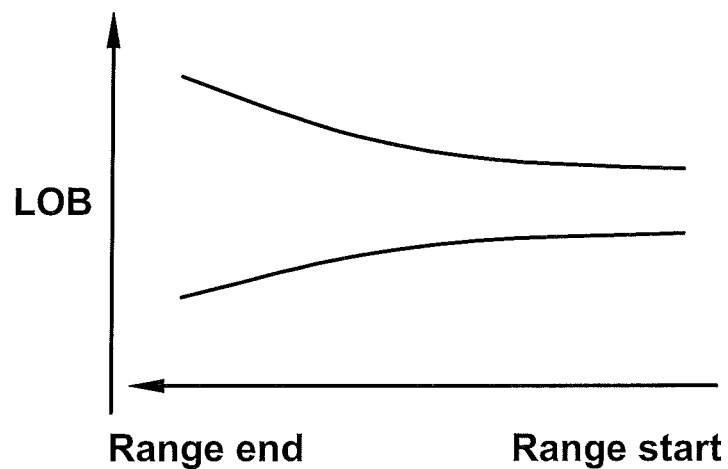
FIG. 4A (FIG. 4A) is an exemplary second order polynomial curve fitting.

The coefficients c1 and c2 are determined from a discrete array of allowed coefficients, based on change in range over the batch interval. The limits for the coefficients c1 and c2 are determined based upon the assumed closest range of a transmit (Tx) platform, and the assumed maximum velocity of the Tx platform. The discrete array of allowed coefficients should have a fidelity to sample every ½ DF accuracy. All polynomial candidate fits for the curve should be tested. An example of a second order polynomial curve fitting is shown in FIG. 4A. Further, there is also an option to fit the AoA versus estimated range data to a linear piece-wise continuous line, with slope changes in the middle of a heading change on the sensor 30. The linear piece-wise continuous line is given by:

$$LOB_{i\_curve}(R) = LOB_o c1 \cdot \Delta R \quad \text{(Equation 2)}.$$

Figure 4B:
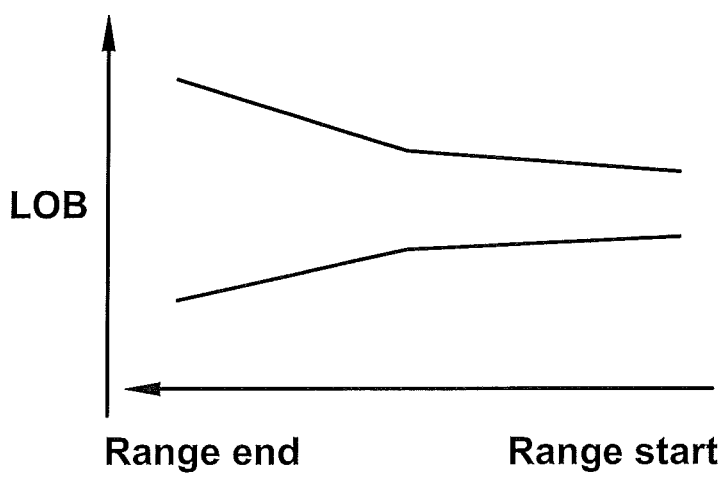
FIG. 4B (FIG. 4B) is an exemplary linear piece-wise continuous between heading changes fitting.

An example of the linear piece-wise continuous between heading changes fitting is shown in FIG. 4B.

The score for each fit comes from a weighted root-mean-square (rms) of the curve fit given by:

$$\Delta\theta_{i_{emitter},i_{AoA}} = \text{AoA}_{i_{AoA}} - \text{LOB}^{i\_curve}(R_{i_{AoA}}) \quad \text{(Equation 3)}.$$

In accordance with one aspect of the present disclosure, rank selection of the emitters 24 is based on total score only. In one example, a 2 sigma cutoff indicates a higher percentage score change between ranks when compared to a 3 sigma cutoff. In one example, when a 2 sigma cutoff is utilized, a threshold of 65% of the highest score, which is equal to #AoAs*N_cutoff^2, is utilized. In one example, if the DF accuracy is known, 75% is the expected value. In one example, in order to allow a change from rank 1 to rank 2, score 2 must be >30% of score 1 and in order to allow a change from rank 2 to rank 3, score 3 must be >15% of score 2.

In accordance with one aspect of the present disclosure, an iterative, greedy searching technique known as Expectation-Maximization is utilized as follows: the outer loop of the program is for n_rank=1:max_rank. The method starts with an initial rank hypothesis. Next, the method selects starting AoAs 28 based on a coarse grouping of AoAs 28 at farther ranges than the starting AoAs to seed the recursive iterations that follow. Next, the method loops through all candidate curves one by one for this candidate rank. Next, the method optimizes one curve to best fit its local AoA 28 data versus estimated range, while holding the other curves fixed. In one example, it is important to try all combinations from an abbreviated test list of candidate coefficients on the first (c1) and second (c2) order terms of delta range. Next, the method re-evaluates a total score after each curve test (for each combination of coefficients). If the hard association score is higher than a previous stored best score, then the method overwrites the stored best fit curves. The program ends with: n_rank for loop. Next, the method calculates soft AoA 28 scores for the final curves for each rank estimate. If soft score at one rank lower is very close to the selected rank based on hard score alone, then the rank estimate is reduced by 1. Every candidate set of polynomial curves will have a hard score. Only the hard score and set of coefficients for the polynomial curves that have the maximum hard score for that particular rank hypothesis will be stored then reported.

If chosen rank is above the number of existing KF number, then there are two options to reevaluate the rank. If enough AoAs 28 exist during the current straight leg, the batch time is limited to the AoAs 28 measured during the current leg. If there are not enough AoAs 28 that exist in the current straight leg, then the AoA-versus-Range rank estimate is checked using a secondary curve fitting test, using linear piece-wise continuous lines, with discrete slope changes in the middle of the heading changes. This piece-wise continuous fit allows the sensor 30 motion removal correction to be tolerant to errors in estimated range, and this piece-wise continuous fit also allows the different emitters 24 to be at different ranges, where the selection of a single range for the single sensor 30 motion removal correction factor will not work for both ranges.

Figure 5:
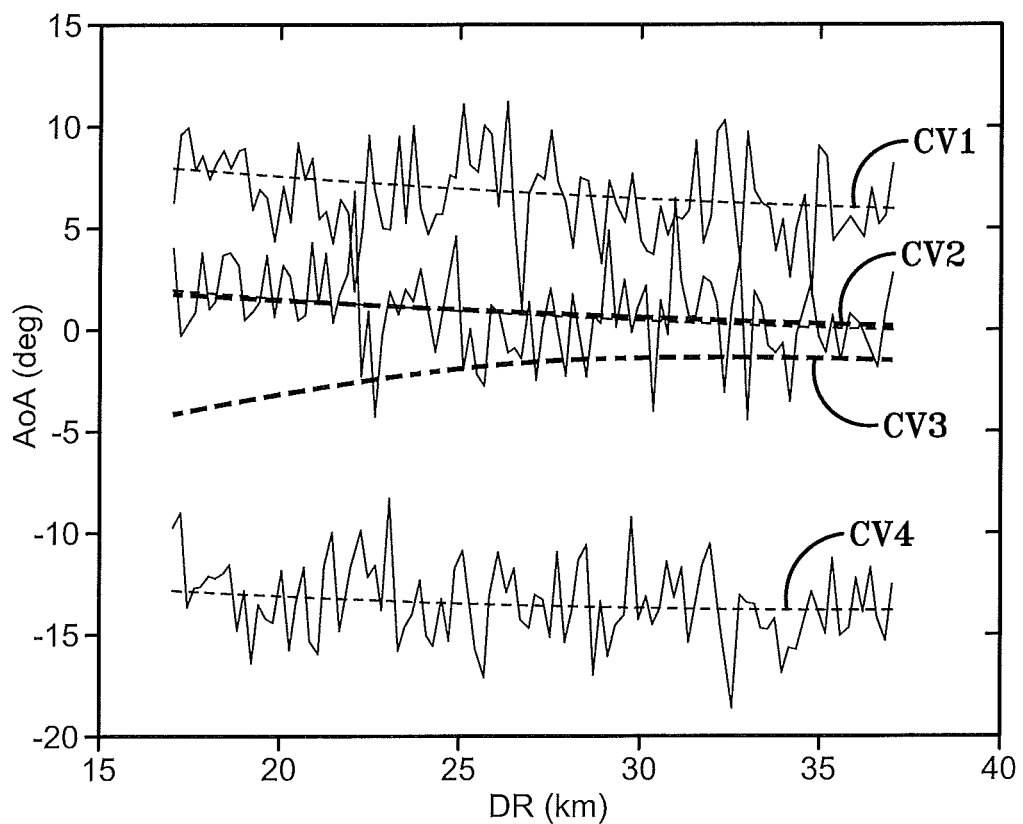
FIG. 5 (FIG. 5) is an exemplary non-optimum single iteration of the greedy search in accordance with the present disclosure.

Reference is made to FIG. 5 which depicts an example of a non-optimum single iteration of the greedy search in accordance with the present disclosure. As show in FIG. 5, curve CV1 and curve CV4 are held fixed. Curve CV3 is an example candidate test third curve, which should have a lower score and be rejected. The method allows the example candidate test curve CV3 to be moved around, testing all start AoAs 28 and polynomial coefficients and searching for a higher score. Curve CV2 is the final stored curve with the highest score. Benefits include, inter alia, allowing each AoA 28 to have different DF sigma for all emitters 24 and emitters 24 do not need to move together. Constraints include imposing >2 DF sigma separation between emitters 24 before declaring two separate emitters 24. As depicted in FIG. 5, the rank of 4, as shown being tested in FIG. 5, should be rejected because the curve CV3 does not follow a smoothly changing group of AoAs 28 versus estimated range. Instead, the rank of 3 is the suitable the outcome.

Figure 6A:
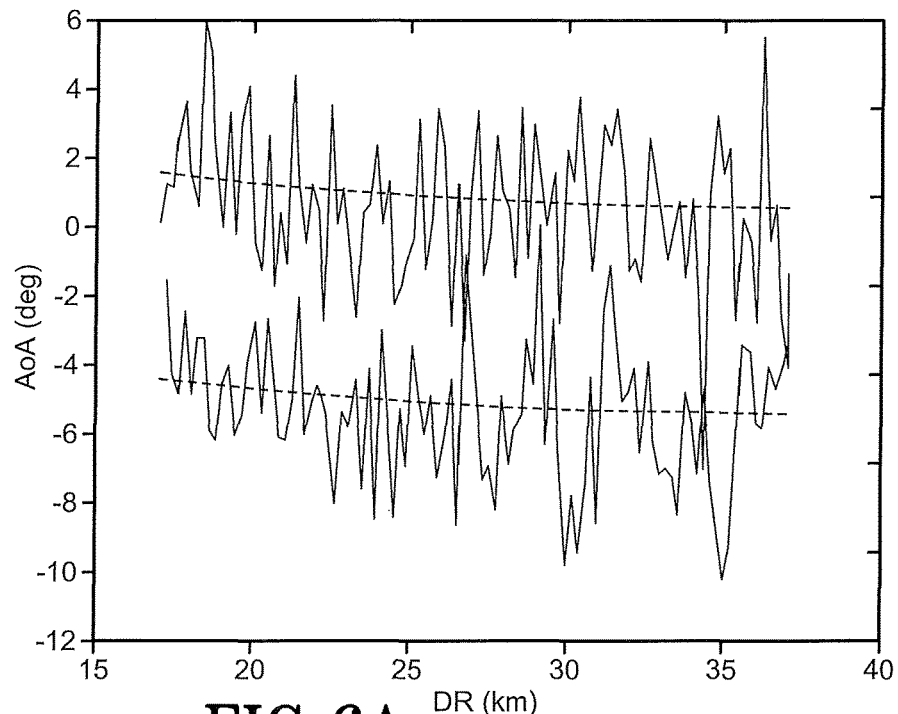
FIG. 6A (FIG. 6A) is a simulated AoA-versus estimated range curve fitting for two emitters.
Figure 6B:
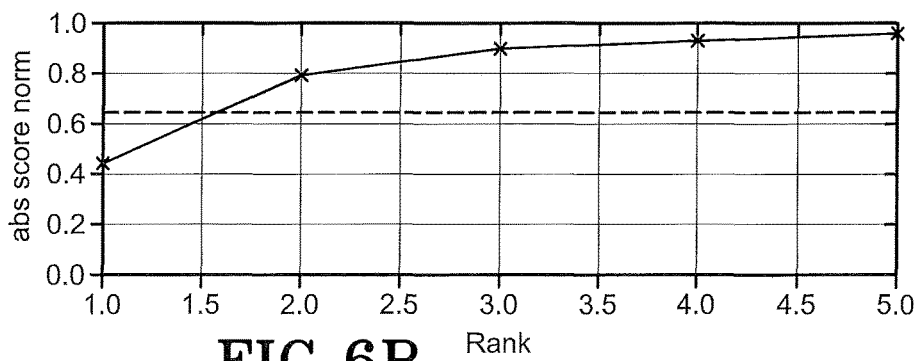
FIG. 6B (FIG. 6B) is absolute score norm versus rank for the two emitters of FIG. 6A.
Figure 6C:
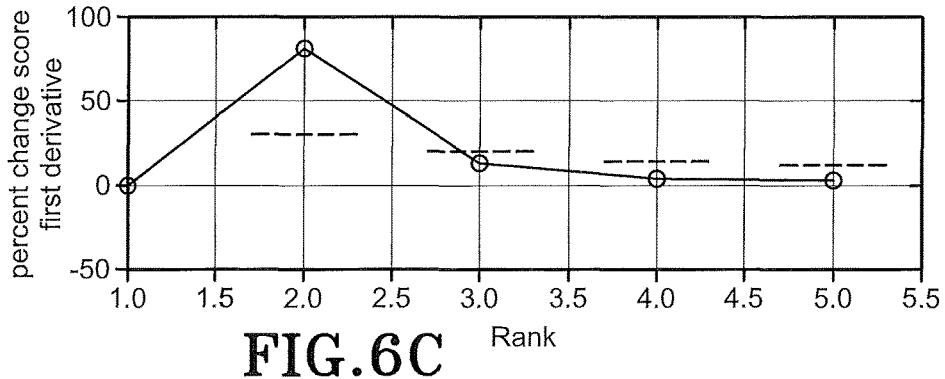
FIG. 6C (FIG. 6C) is percent change score first derivative versus rank of the two emitters of FIG. 6A.

Reference is made to FIG. 6A, which depicts a simulated AoA versus estimated range curve fitting for two emitters 24, FIG. 6B which depicts absolute score norm versus rank of the two emitters 24 of FIG. 6A, and FIG. 6C which depicts percent change score first derivative versus rank of the two emitters 24 of FIG. 6A. FIG. 6A-FIG. 6C together represent the greedy search for AoA versus estimated range curve fits and rank selection of emitters 24. The horizontal dashed line corresponds to the expected score for a noisy measurement, where the measured AoA 28 errors are accurately represented by the assumed AoA 28 uncertainty. The reported/selected rank is the first rank with a score that exceeds the expected score for a noisy measurement. Rank 2 is the first score to exceed the expected score for a noisy measurement, and the score improvement between rank 1 and rank 2 is statistically significant. As shown in FIG. 6B, ranks two and above are above the threshold. As shown in FIG. 6C, there is a 30% level change represented by arrow A1 and a 15% level change represented by arrow A2.

Figure 7A:
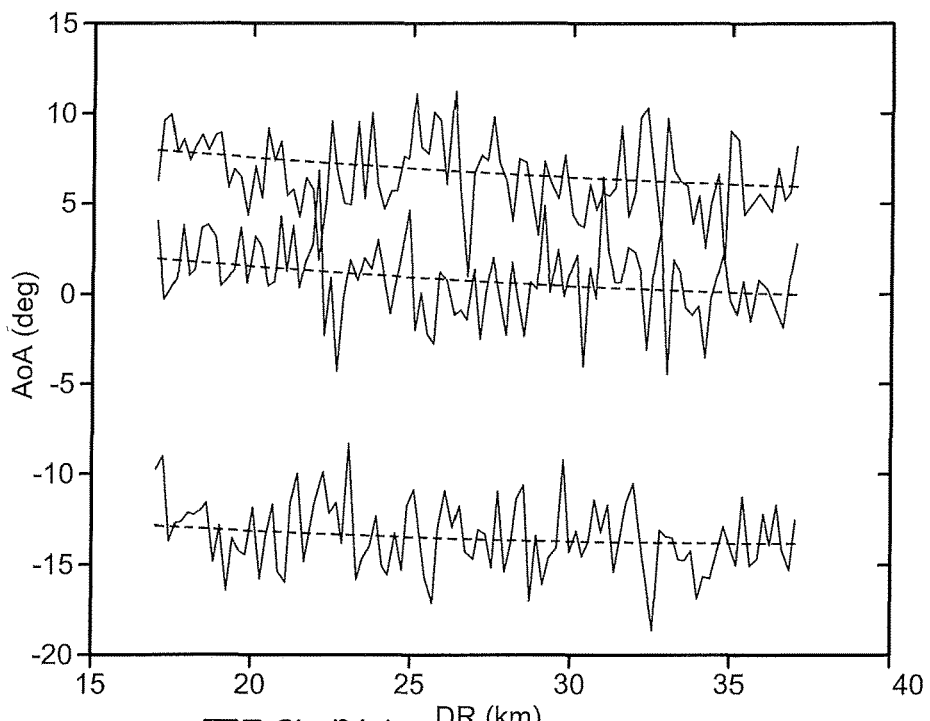
FIG. 7A (FIG. 7A) is a simulated AoA-versus estimated range curve fitting for three emitters.
Figure 7B:
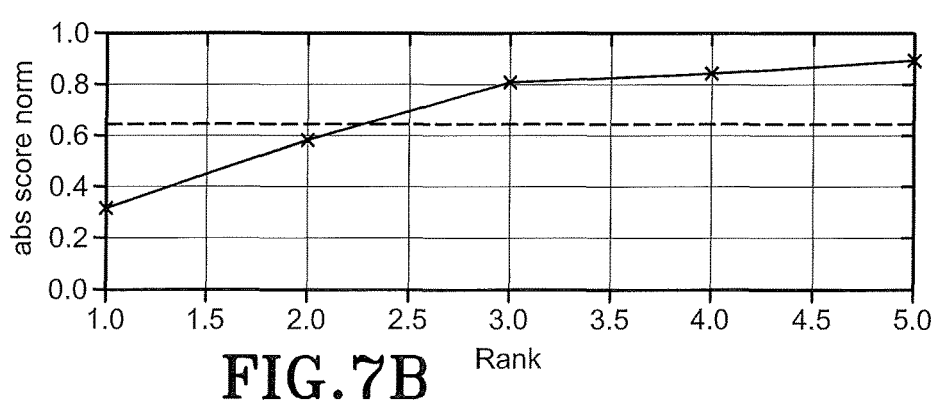
FIG. 7B (FIG. 7B) is abs score norm versus rank for the two emitters of FIG. 7A.
Figure 7C:
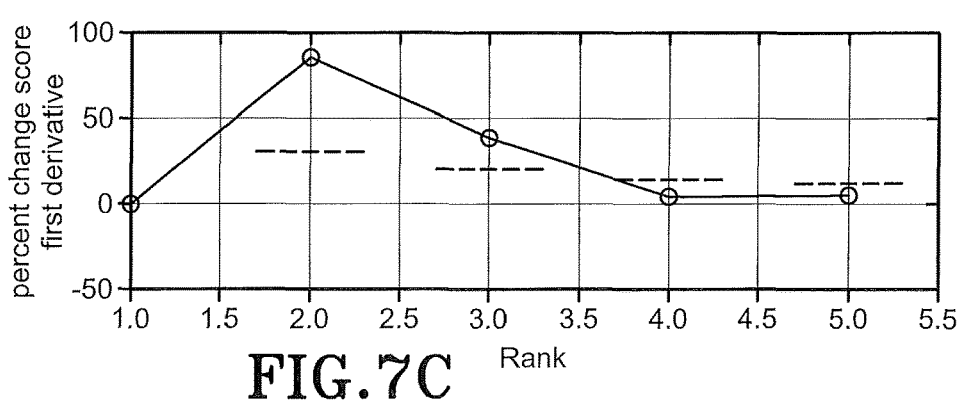
FIG. 7C (FIG. 7C) is percent change score first derivative versus rank of the two emitters of FIG. 7A.

Reference is made to FIG. 7A, which depicts a simulated AoA-versus estimated range curve fitting for three emitters 24, FIG. 7B which depicts absolute score norm versus rank of the three emitters 24 of FIG. 7A, and FIG. 7C which depicts percent change score first derivative versus rank of the three emitters 24 of FIG. 7A. FIG. 7A-FIG. 7C together represent the greedy search for AoA versus estimated range curve fits and rank selection of emitters 24. The horizontal dashed line corresponds to the expected score for a noisy measurement, where the measured AoA 28 errors are accurately represented by the assumed AoA 28 uncertainty. The reported/selected rank is the lowest rank with a score that exceeds the expected score for a noisy measurement. Rank 3 is the first score to exceed the expected score for a noisy measurement, and the score improvement between rank 2 and rank 3 is statistically significant. As shown in FIG. 7B, ranks three and above are above the threshold. As shown in FIG. 7C, there is a 15% level change represented by arrow A3.

In accordance with one aspect of the disclosure, there are two ways to check the accuracy of the JML-ME-AoA-vs-Range instructions before reporting the rank prediction. The first accuracy check accommodates different DF system sigma per AoA 28 measurement by calculating a hard score and a soft score fit to the AoA 28 distribution for the final prediction. Calculating the soft score will aid in avoiding over-estimating the number of emitters 24. The soft score is calculated using different AoA 28 accuracies per AoA 28 measurement. If the soft score of the rank below the chosen rank is within 4% of the chosen rank, then the rank is reduced to the lower rank. Soft scores have the beneficial feature of having the score-versus-rank saturate at the rank of the true number of emitters 24. Hard scores continually increase versus rank beyond true rank due to AoA 28 assignments restricted to much less than a sigma cutoff. Another advantage of using the score-versus-rank is that the individual AoA 28 uncertainties can be used for each AoA 28 measurement, instead of using an average uncertainty (i.e. sigma).

The hard assignment score is given by:

$$\text{Score}(N_{rank}) = \sum_{i_{emitter}}^{N_{rank}} \sum_{i_{AoA}}^{n_{AoA\_per\_emit}} \left[ n_{sigma\_cutoff}^2 - \left( \frac{\Delta\theta_{i_{emitter}, i_{AoA}}}{\sigma_{i_{AoA}}} \right)^2 \right]. \quad \text{(Equation 4)}$$

The method performs hard AoA 28 associations to emitters 24 already performed, using hard-limiting in a two-dimensional search grid. The maximum unphysical score is when the delta AoAs 28 are zero which indicates a perfect AoA 28 agreement with the hypothesized rank and AoAs 28 of the emitters 24 as given by:

$$\text{Score\_norm}(N_{rank}) = \frac{\text{Score}(N_{rank})}{N_{AoAs} n_{sigma\_cutoff}^2}. \quad \text{(Equation 5)}$$

A higher score is better, within expectations for ideal AoA 28 sigma. Generally, the scores get higher when assuming more emitter 24 curves to fit the AoA 28 data. However, the score needs to get statistically higher, above established thresholds, to be statistically valid.

The soft score assignment is given by:

$$\text{Score}(N_{rank}) = \sum_{i_{emitter}}^{N_{rank}} \sum_{i_{AoA}}^{n_{AoA\_per\_emit}} P_{i_{emitter}, i_{AoA}}(\Delta\theta_{i_{emitter}, i_{AoA}}) \quad \text{(Equation 6)}$$

$$\left[ n_{sigma\_cutoff}^2 - \left( \frac{\Delta\theta_{i_{emitter}, i_{AoA}}}{\sigma_{i_{AoA}}} \right)^2 \right].$$

The probability that the AoA is assigned correctly to the emitter assumed is given by:

$$P_{i_{emitter}, i_{AoA}}(\Delta\theta_{i_{emitter}, i_{AoA}}) = \quad \text{(Equation 7)}$$

$$\frac{\exp\left[-\left(\frac{\Delta\theta_{i_{emitter}, i_{AoA}}}{\sigma_{AoA}}\right)^2\right]}{\sum_{i_{emitter}}^{N_{emitter}} \exp\left[-\left(\frac{\Delta\theta_{i_{emitter}, i_{AoA}}}{\sigma_{AoA}}\right)^2\right]}.$$

Reference is made to FIG. 8 which shows the probabilities, $P_1$ and $P_2$, that a particular AoA 28 is associated with the first or second Gaussian curve. FIG. 8 also shows the hard association boundary point as HA. Rather than associate AoA 28 with Gaussian curve two, the AoA 28 is soft-associated with each of the Gaussian curves using the weight according to:

$$wgt_i = \frac{N_i P_i}{\sum_{k=1}^{N} N_i P_i} \quad \text{(Equation 8)}$$

and according to:

$$N_i = \text{count}(|x - \mu_i| < \sigma) \quad \text{(Equation 9)}$$

$$P_i = e^{\frac{-(x - \mu_i)^2}{2\sigma^2}}.$$

The soft score provides robustness for the score value above the true number of emitters 24. The score versus rank will plateau above the true rank. The AoAs 28 are not artificially filtered to an over-abundance of test emitters 24 where the effective sigma would be well below the physical measurement sigma. Further, the hard association case at the decision boundaries creates a further distortion of the cost function.

Figure 9:
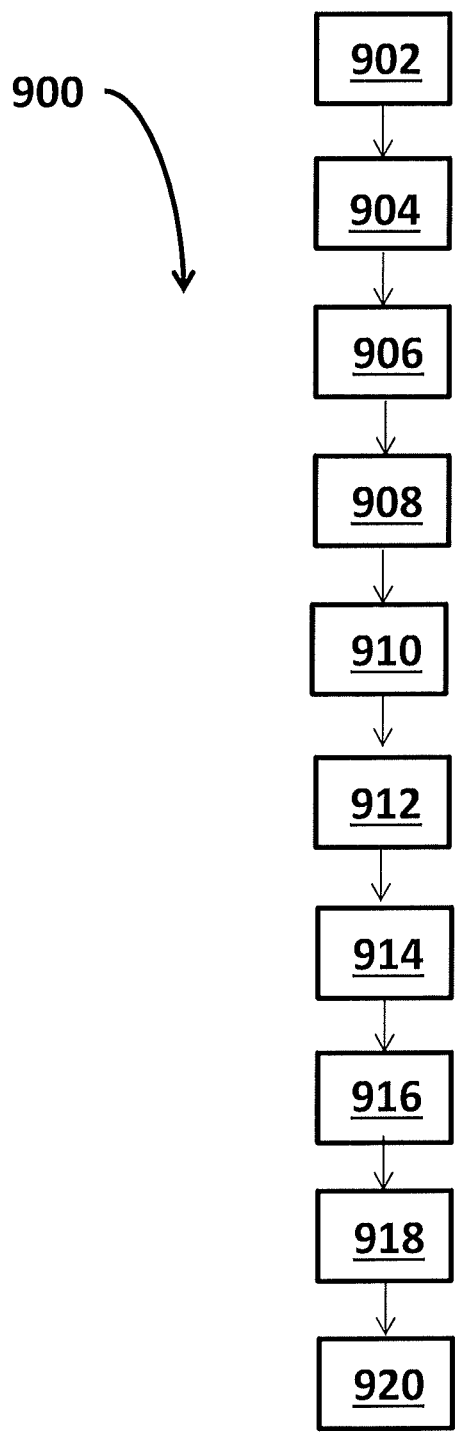
FIG. 9 (FIG. 9) is a flow chart depicting an exemplary method for ranking estimation.

In accordance with one aspect of the disclosure, reference is made to a ranking estimation method depicted in the flowchart of FIG. 9. The ranking estimation method 900 first measures AoAs 28 from at least one electromagnetic emitter 24, which is shown generally at 902. The accuracy of the measured AoAs 28 is established, which is shown generally at 904. Tracks are assigned to the AoAs 28, which is shown generally at 906. A graph of the AoAs 28 versus estimated range or time is created, which is shown generally at 908. A maximum set of hypothesized ranks is declared, which is shown generally at 910. Each rank of the set of hypothesized ranks is iteratively tested by curve fitting a set of polynomial curves for each rank of the set of hypothesized ranks to the graph, wherein the number of polynomial curves is equal to the particular hypothesized rank, which is shown generally at 912. Hard scores are calculated for all combinations of coefficients for each of the polynomial curves for each rank of the set of hypothesized ranks, which is shown generally at 914. Only a maximum hard score and a set of coefficients for the maximum hard score for each of the hypothesized ranks is stored, which is shown generally at 916. A rank estimation of the at least one electromagnetic emitter 24 is determined, which is shown generally at 918. The track associated with the at least one electromagnetic emitter 24 is reported, which is shown generally at 920.

In accordance with one aspect of the present disclosure, and in summary, the ranking system includes the vehicle 12 carrying the detection system 14, a computer 16 operatively coupled to the memory 17 and the processor 18 which operate to collectively to define the non-transitory computer-readable medium, the network connection 20 and at least one electromagnetic signal 22 coming from the at least one electromagnetic emitter 24 detected by the detection system.

In operation, the vehicle 12 moves in a trajectory and the detection system 14 moves in the same trajectory. The detection system 14, such as a DF system, measures AoA 28 data of the at least one electromagnetic signal 22 coming from the at least one electromagnetic emitter 24 via the sensor 30 in real time. The non-transitory computer-readable medium allows the DF system to estimate an accuracy of the measured AoAs 28.

The non-transitory computer-readable medium allows the measured AoAs 28 to be assigned to a particular track, such as a KF track. AoAs 28 in clusters are assigned to the same track and are stored by the computer 16. Periodically, the AoAs 28 of all clusters associated with each track are re-assessed and the number of tracks is confirmed. This is accomplished by using a track splitting code, such as JML-ME-AoA-vs-Range instructions being run by the non-transitory computer-readable medium and performing a rank estimation.

The JML-ME-AoA-vs-Range instructions sort AoAs 28 based on groupings of AoAs 28 versus estimated range or time by curve fitting AoAs 28 versus estimated range or time data. The non-transitory, computer-readable medium provides instructions to create a graph of the AoAs 28 versus estimated range or time and instructions to declare a maximum set of hypothesized ranks, iteratively test each rank of the set of hypothesized ranks by curve fitting a set of polynomial curves for each rank of the set of hypothesized ranks to the graph, wherein the number of polynomial curves is equal to the particular hypothesized rank. The non-transitory computer-readable medium provides instructions to calculate hard scores for all combinations of coefficients for each of the polynomial curves for each rank of the set of hypothesized ranks and store only a maximum hard score and a set of coefficients for the maximum hard score for each of the hypothesized ranks. The non-transitory computer-readable medium provides instructions for determining a rank estimation of the at least one electromagnetic emitter 24 such as by calculating hard scores, for calculating a soft scores and for analyzing the calculated hard scores and the calculated soft scores to check the accuracy of the polynomial curve fit before reporting the track associated with the at least one electromagnetic emitter 24. The non-transitory computer-readable medium provides instructions for performing a greedy search, such as a greedy search that utilizes a 2 sigma cutoff, although a sigma cutoff of 1 or more may also be utilized. Once the rank estimation is complete, the non-transitory computer-readable medium provides instructions for reporting the track associated with the at least one electromagnetic emitter 24 to update a mission computer (not shown).

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the present disclosure. The various appearances "an embodiment," "one embodiment," "some embodiments," "one particular embodiment," or "other embodiments," or the like, are not necessarily all referring to the same embodiments.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the present disclosure is not limited to the exact details shown or described.

The invention claimed is:

1. A system for determining a rank estimation of electromagnetic emitters comprising:
   a moveable detection system; and
   a non-transitory computer-readable storage medium having instructions encoded thereon that, when executed by one or more processors, result in the following operations for determining rank estimation of electromagnetic emitters:
      measuring angles of arrival (AoAs) of at least one signal emitted from at least one electromagnetic emitter received at a detection system;
      estimating an accuracy of the measured AoAs by the detection system;
      assigning a track to the AoAs;
      creating a graph of the AoAs versus an estimated range or time;
      declaring a maximum set of hypothesized ranks;
      iteratively testing each rank of the set of hypothesized ranks by curve fitting a set of polynomial curves for each rank of the set of hypothesized ranks to the graph, wherein the number of polynomial curves is equal to the particular hypothesized rank;
      calculating hard scores for all combinations of coefficients for each of the polynomial curves for each rank of the set of the hypothesized ranks;
      storing only a maximum hard score and a set of coefficients for the maximum hard score for each of the hypothesized ranks;
      determining a rank estimation of the at least one electromagnetic emitter; and
      reporting the track associated with the at least one electromagnetic emitter.

2. The system of claim 1, wherein each of the polynomial curves in the set of polynomial curves is at least a second order polynomial curve.

3. The system of claim 2, wherein the detection system is a direction finding (DF) system with a known sigma; and wherein the medium further comprises instructions encoded thereon that, when executed by one or more processors, result in imposing greater than two DF sigma before determining the rank estimation of the at least one electromagnetic emitter.

4. The system of claim 3, wherein each of the AoAs has a different DF sigma for the at least one electromagnetic emitter.

5. The system of claim 2, wherein the medium further comprises instructions encoded thereon that, when executed by one or more processors, result in preconditioning the AoAs prior to assigning a track to the AoAs.

6. The system of claim 3, wherein the medium further comprises instructions encoded thereon that, when executed by one or more processors, result in the following operations:
   calculating soft scores; and
   analyzing the calculated hard scores and the calculated soft scores to check the accuracy of the polynomial curve fits before reporting the track associated with the at least one electromagnetic emitter.

7. The system of claim 6, wherein when the calculated soft score of the rank estimation is below a chosen rank within 4% of the chosen rank, then the rank estimation is reduced to the lower rank.

8. The system of claim 7, wherein the medium further comprises instructions encoded thereon that, when executed by one or more processors, result in performing a greedy search.

9. The system of claim 8, wherein the greedy search utilizes a sigma cutoff of at least one sigma.

10. The system of claim 1, wherein the AoAs are measured while the detection system moves in a trajectory.

11. The system of claim 1, wherein the AoAs are measured while the at least one electromagnetic emitter moves in a trajectory.

12. The system of claim 1, wherein the AoAs are measured while the detection system moves in a first trajectory and the at least one electromagnetic emitter moves in a second trajectory.

13. A method for rank estimation of electromagnetic emitters comprising:
   moving a detection system in a trajectory;
   measuring angles of arrival (AoAs) of at least one signal emitted from at least one electromagnetic emitter received at the detection system;
   estimating an accuracy of the measured AoAs by the detection system;
   assigning a track to the AoAs;
   creating a graph of the AoAs versus estimated range or time;
   declaring a maximum set of hypothesized ranks;
   iteratively testing each rank of the set of hypothesized ranks by curve fitting a set of polynomial curves for each rank of the set of hypothesized ranks to the graph, wherein the number of polynomial curves is equal to the particular hypothesized rank;
   calculating hard scores for all combinations of coefficients for each of the polynomial curves for each rank of the set of hypothesized ranks;
   storing only a maximum hard score and a set of coefficients for the maximum hard score for each of the hypothesized ranks;
   determining a rank estimation of the at least one electromagnetic emitter; and
   reporting the track associated with the at least one electromagnetic emitter.

14. The method for rank estimation of electromagnetic emitters of claim 13, further comprising:
   moving the at least one electromagnetic emitter in a second trajectory.

15. The method for rank estimation of electromagnetic emitters of claim 14, wherein each of the polynomial curves in the set of polynomial curves is at least a second order polynomial curve.

16. The method for rank estimation of electromagnetic emitters of claim 15, wherein the detection system is a direction finding (DF) system with a known sigma; and wherein the method for rank estimation of electromagnetic emitters further comprises imposing greater than two DF sigma before determining the rank estimation of the at least one electromagnetic emitter.

17. The method for rank estimation of electromagnetic emitters of claim 16, wherein each of the AoAs has a different DF sigma for the at least one electromagnetic emitter.

18. The method for rank estimation of electromagnetic emitters of claim 17, further comprising:
- calculating soft scores; and
- analyzing the calculated hard scores and the calculated soft scores to check the accuracy of the polynomial curve fit before reporting the track associated with the at least one electromagnetic emitter.

19. The method for rank estimation of electromagnetic emitters of claim 18, further comprising:
- performing a greedy search.

20. The method for rank estimation of electromagnetic emitters of claim 19, wherein the greedy search utilizes a sigma cutoff of at least one sigma.

* * * * *